Dec. 31, 1929.  E. R. NEWTON  1,741,729
POWER PLANT
Filed Jan. 27, 1923   2 Sheets-Sheet 1
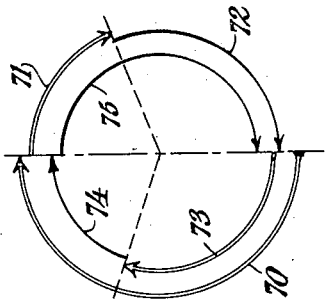
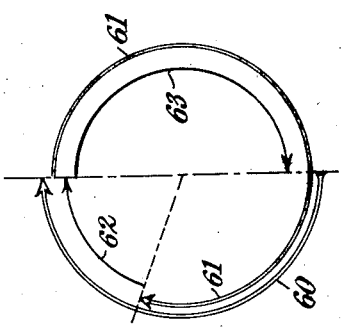
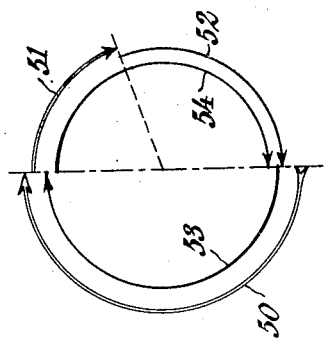
INVENTOR:
Earle R. Newton,
By Attorneys,
Fraser Turks Myers Dec. 31, 1929.  E. R. NEWTON  1,741,729
POWER PLANT
Filed Jan. 27, 1923   2 Sheets-Sheet 2
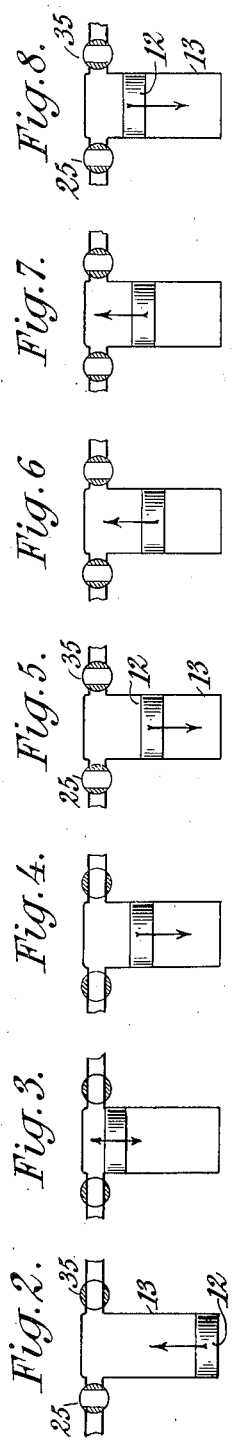
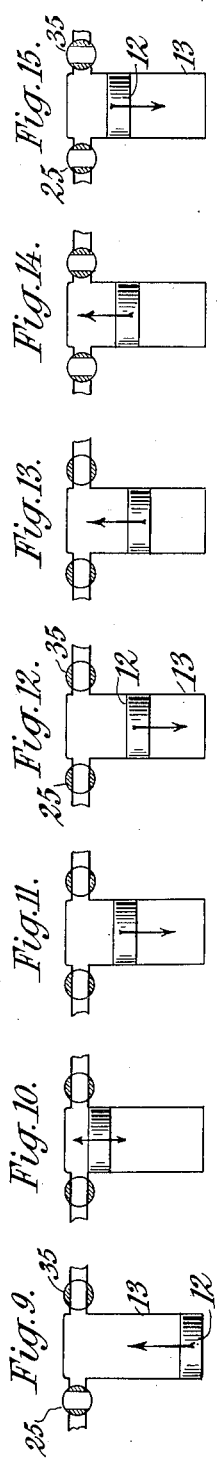
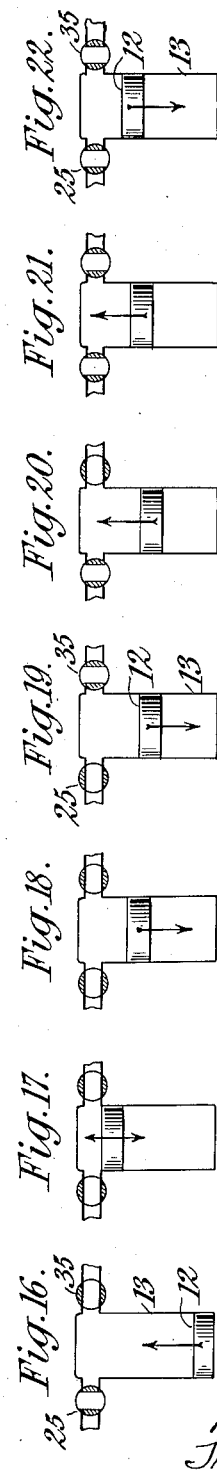
INVENTOR:
Earle R. Newton,
By Attorneys, Patented Dec. 31, 1929

1,741,729

UNITED STATES PATENT OFFICE

EARLE R. NEWTON, OF NEW YORK, N. Y., ASSIGNOR TO CURTIS GAS ENGINE CORPORATION, OF NEW YORK, N. Y., A CORPORATION OF NEW YORK

POWER PLANT

Application filed January 27, 1923. Serial No. 615,286.

This invention relates to power plants of the type set forth in applicant's Letters Patent of the United States, #1,634,797, granted July 5, 1927, comprising an internal combustion engine charged and scavenged at super-atmospheric pressure, by precompressed air, and a turbine driven by the exhaust gas and scavenging air from said engine, and provides a novel combination for effecting the charging and scavenging of the cylinders of said engine, and the cooling of the valves.

The object of the invention is to provide means whereby the cylinders are well scavenged of burned products and the valves are well cooled, the construction and operation of said means being of maximum simplicity. Furthermore, the charging and scavenging of the engine cylinders and the cooling of the valves may all be accomplished with compressed air from one source at one pressure.

An embodiment of said invention is illustrated in the accompanying drawings, wherein,—

Figure 1 is a diagrammatic plan view of said power plant.

Figs. 2 to 22, inclusive, are diagrammatic views illustrating the engine parts at different parts of a four-stroke cycle; Figs. 2-8 illustrating one mode of operation; Figs. 9-15 illustrating a somewhat different mode of operation; and Figs. 16-22 illustrating still another somewhat different mode of operation.

Figs. 23, 24 and 25 are diagrams showing a four-stroke cycle of the engine and corresponding to the three modes of operation shown in Figs. 2-22, inclusive.

Referring to said drawings, numeral 10 designates the four-cycle reciprocating internal combustion engine, which may be any suitable type, 11 an elastic fluid turbine of any suitable kind, and 15 an air compressor, which may be of any suitable kind, and which may be driven by the engine or turbine, being here shown as driven by the engine 10. Numeral 12 designates the engine pistons, and 13 the engine cylinders.

The engine and turbines are preferably arranged to act upon a single drive shaft, and to this end the engine shaft and turbine shaft may be geared together, as by means of gears 14.

Air is conveyed from the compressor 15 to the engine 10 through a pipe 16 and intake manifold 18, the air preferably passing through a cooler 20 where it is cooled and the density increased. Admission to the cylinders 13 of the engine is controlled by the usual valves 25, and exhaust or transfer of the combusted and partially expanded gas in the cylinders, to the manifold 30 and thence to the turbine 11, is controlled by the usual exhaust valves 35. The manifold 30 acts as a receiver, whereby the gas may be supplied to the turbine at a substantially constant pressure. Fuel may be supplied to the engine cylinders through the orifices 40.

*Operation.*—Referring to Figs. 2, 9 and 16, and to the diagrams of operation, Figs. 23, 24 and 25, the combusted gas in the cylinder 13, which has been partially expanded therein to say eleven atmospheres, is expelled (exhausted) by the piston 12, and enters the manifold 30, which acts as a receiver at say 8 atmospheres. See the arrows 50, Fig. 23, 60, Fig. 24, and 70, Fig. 25. The duration of this exhaust period is one stroke or thereabout.

The residual exhaust gas remaining in the clearance space of the cylinder 13 at the end of the exhaust stroke (Figs. 3, 10 and 17) is scavenged by opening the inlet valve 25, which admits air at say 11 atmospheres, and forces the residual gas into the receiver or manifold 30. Additional air for cooling the valves and charging the cylinder may enter on the heels of the scavenging air. The exhaust or transfer valve 35 remains open during this period (Figs. 4, 11 and 18). The duration of this period may extend through a part of the charging or suction stroke, or it may extend through the entire suction stroke and part of the succeeding compression stroke, as explained in the following description.

Referring to Figs. 5 and 6, the admission and exhaust valves 25 and 35 may both be closed when the piston is part way (say ⅓ of the way as indicated by arrow 51, Fig.

23) down on its charging or suction stroke, leaving a charge of 11 atmospheres in the space above the piston. During the remainder of the stroke this charge of air will be expanded down to say 3 atmospheres (arrow 52, Fig. 23) and on the following stroke it will be compressed to the desired working pressure, say 60 atmospheres, both the admission and the exhaust valves remaining closed (Figs. 6 and 7 and arrow 53, Fig. 23). Thus the duration of the period for scavenging and cooling the valves extends over about ⅓ of a stroke and the period during which fluid at approximately constant pressure is being delivered to the receiver is about 1⅓ strokes. Fuel is introduced into the cylinder and burned, and the gas expanding from say 60 atmospheres to 11 atmospheres drives the piston on its power stroke, Fig. 8, the duration of this being one stroke, or thereabout (arrow 54, Fig. 23), and the gas expanded to say 11 atmospheres is exhausted or expelled into the receiver 30, as explained in connection with Fig. 2.

Instead, however, of closing the valves 25, 35 when the piston is part way down on the suction stroke, as in Fig. 5, these valves 25, 35 may be left open (Figs. 12 and 13) during the entire suction stroke and during part, say ⅔, of the succeeding compression stroke; air continues to enter the cylinders and to pass over into the receiver 30 during this entire period, thereby insuring very effective cooling of the valves and a cool mixture to be delivered to the turbine 11. Further, the duration of the period during which the receiver 30 is being supplied at approximately constant pressure is materially lengthened. Air continues to pass in and out of the cylinder 13 throughout the intake or suction stroke of the piston 12 (Fig. 12), and on the compression stroke (Fig. 13) until the piston 12 reaches that part of its stroke, say ⅔ of the way up, where, in what remains thereof, it is able to raise the pressure of the air in the cylinder to the desired full compression pressure of say 60 atmospheres. (See arrow 61, Fig. 24.) The arrangement is such that air is passed through the cylinders during say 1⅔ strokes. The valves 25, 35 then close, and during the remaining ⅓ stroke, the air is compressed in the cylinder to full compression (60 atmospheres), fuel being introduced, and the heated gas expanding to drive the piston 12, as described above in connection with Figs. 7 and 8. (See arrows 62, 63, Fig. 24.)

In the first cycle of valve operation described above compressed air is passed through the engine cylinder to the turbine during about ⅓ of one stroke of the piston. In the second cycle of valve operation described the compressed air is passed during about 1⅔ strokes. By other cycles of valve operation the period of passing the compressed air through the engine cylinder to the turbine may be made to fall between these two. For example with the inlet valve 25 remaining open during the entire suction stroke, and during say ⅔ of the compression stroke as described above, the exhaust valve 35 may be closed at any time desired between ⅓ of the suction stroke and ⅔ of the compression stroke. In this case compressed air would be admitted through the inlet valve to the engine cylinder during the entire suction stroke and would be pushed back through the same inlet valve during ⅔ of the compression stroke.

Or instead of keeping the valves 25, 35 both open after the cylinder 13 has been scavenged and has received enough air for supplying the charge at full compression, (a period of say ⅓ stroke—see arrow 71, Fig. 25), the exhaust or transfer valve 35 may close Fig. 19, the admission valve 25 meanwhile remaining open, so that the cylinder is filled with air at say 11 atmospheres throughout the remainder of the intake stroke of the piston—see arrow 72. Thereupon, on the compression stroke, the exhaust or transfer valve 35 again opens, Fig. 20 (the inlet valve 25 may be left open or may be closed at this point, as desired), and air at 11 atmospheres is ejected into the receiver 30, the piston continuing to eject air from the cylinder 13, until it reaches that part of its stroke (say ⅔) where, in what remains thereof, the piston is able to raise the pressure of the air in the cylinder to the desired full compression pressure of say 60 atmospheres—see arrow 73, Fig. 25. The valves 25 (if open) and 35 then close, and during the remaining ⅓ stroke, the air is compressed in the cylinder to full compression (60 atmospheres), fuel being introduced and the heated gas expanding to drive the piston 12, as indicated above in connection with Figs. 7 and 8. (See arrows 74, 75, Fig. 25.)

In Figs. 23, 24 and 25 the double line arrows indicate the time when the transfer or exhaust valve 35 is open and the manifold or receiver 30 is receiving exhaust gas or compressed air from the engine 10.

According to the arrangement illustrated in Figs. 2–8 and Fig. 23, air is admitted to the cylinder 13 at say 11 atmospheres during approximately ⅓ of the intake or charging stroke (Fig. 4 and arrow 51, Fig. 23). It is then expanded down to 3 atmospheres (Fig. 5 and arrow 52) and then compressed to say 60 atmospheres (Figs. 6 and 7 and arrow 53). Fuel is burned, and the gas expands to 11 atmospheres (Fig. 8 and arrow 54) at which point of expansion the gas is transferred to the turbine (Fig. 2 and arrow 50). The exhaust or transfer valve 35 remains open during the exhaust stroke (Fig. 2 and arrow 50) and during about ⅓ of the following intake or charging stroke. During the latter time the residual exhaust gas and compressed air are being delivered to the receiver 30 (Fig. 3 and arrow 51).

According to the arrangement of Figs. 9-15 and Fig. 24, air is admitted to the cylinder 13 at 11 atmospheres during the entire intake or charging stroke (Fig. 12 and arrow 61, Fig. 24) and during ⅔ of the following compression stroke (Fig. 13 and arrow 61). The air in the cylinder 13 is then compressed to 60 atmospheres (Fig. 14 and arrow 62) and after fuel is burned the gas is expanded down to 11 atmospheres (Fig. 15 and arrow 63) and transferred to the turbine (Fig. 9 and arrow 60). The exhaust or transfer valve 35 remains open during the exhaust stroke, during the intake or charging stroke and during ⅔ of the compression stroke (Figs. 9-13 and arrows 60 and 61, Fig. 24). Thus the period for scavenging and cooling the valves with the relatively cool compressed air is lengthened to include the full intake or charging stroke and ⅔ of the compression stroke, as compared with only ⅓ of the intake or charging stroke, as in the arrangement of Figs. 2-8 inclusive and Fig. 23.

Further, by passing the air through the cylinder 13, as in Figs. 11, 12, 13 and arrow 61, Fig. 24, a longer and consequently steadier impulse is imparted to the turbine, as the manifold 30 not only receives gas during the exhaust stroke or period (Fig. 9 and arrow 60) and ⅓ of the intake or charging stroke (Fig. 11), but also receives gas (air) during the remainder of the intake or charging stroke and part of its compression stroke or period (Figs. 12 and 13 and arrow 61). Therefore, the receiver 30 receives gas from the engine 10 during 2⅔ strokes out of four in one case (arrows 60, 61, Fig. 24) and during 1⅓ strokes out of four in the other case (arrows 50, 51, Fig. 23).

According to the arrangement of Figs. 16-22 and Fig. 25, air is admitted to the cylinder 13 at 11 atmospheres during the entire intake or charging stroke (Figs. 18 and 19, and arrows 71, 72, Fig. 25) and the excess air in the cylinder is ejected during ⅔ of the compression stroke (Fig. 20 and arrow 73). The air in the cylinder 13 is then compressed to 60 atmospheres (Fig. 21 and arrow 74), and after fuel is burned, the gas is expanded down to 11 atmospheres (Fig. 22 and arrow 75) and transferred to the turbine (Fig. 16 and arrow 70). The exhaust or transfer valve 35 remains open during the exhaust stroke or period (Fig. 16 and arrow 70), during ⅓ of the intake or charging stroke or period (Fig. 18 and arrow 71) and during ⅔ of the compression stroke or period (Fig. 20 and arrow 73). Moreover, the cylinder 13 receives air during ⅔ of a stroke after the transfer valve 35 closes (Fig. 19 and arrow 72). This arrangement represents a middle condition as regards the other two conditions in respect to the cooling of the valves and the time during which the receiver 30 is receiving gas from the engine 10. In this case the cylinder 13 receives cooling air during one stroke (a part of which is ejected during ⅔ of ensuing stroke)—see arrows 71, 72, and the receiver 30 receives gas during the exhaust stroke (arrow 70), ⅓ of the intake or charging stroke (arrow 71) and ⅔ of the compression stroke (arrow 73)—making 2 full strokes during which the receiver 30 is receiving gas from the engine.

The arrangements shown in Figs. 2-8, Figs. 9-15 and Figs. 16-22 are susceptible to many modifications by which the length of the period for scavenging and cooling the valves by air blown through the cylinders, may be varied, and also by which the period during which the receiver 30 receives gas from the engine, may be varied.

In the foregoing description the small pressure drops necessary to put the air or gas through the valves or parts has been neglected. The compressed air used for scavenging and for charging the cylinders must of necessity be at a few points higher pressure than exists in the cylinder, and the pressure in the cylinder must likewise be a few points higher in pressure than exists in the discharge pipe, that is, if the cylinder is charged to 11 atmospheres and expands to 11 atmospheres, the scavenging or pressure must be 11 atmospheres plus, and the pressure in the discharge pipe must be 11 atmospheres minus.

In a companion application, Serial No. 616,859, filed February 3, 1923, there is disclosed a power plant in which air at one pressure is admitted to the cylinder of the engine for charging them, and air at a higher pressure is admitted for scavenging and cooling the valves, whereas in the present application all of the air is admitted to the cylinder at one pressure, say 11 atmospheres. The former power plant involves less work of compression, and is therefore more efficient, but the latter requires less valve mechanism, and is therefore simpler.

The turbine described herein seems to be the device most likely to be used, at the present time, in combination with the reciprocating internal combustion engine; but it will be obvious that any other suitable device may be substituted for said turbine as the equivalent thereof.

The inventive idea is not limited to the specific embodiments thereof herein specifically illustrated and described.

What is claimed is:—

1. In a combination power plant comprising a 4-stroke cycle internal combustion engine and secondary expansion apparatus, means for operating said engine on a cycle comprising a suction stroke, a compression stroke, an expansion stroke and an exhaust stroke, means for driving out by the return movement of the pistons of said engine on their exhaust strokes the main exhaust gas, and, by pre-compressed air the residual exhaust gas from the clearance space at the end of said exhaust strokes, and means for transferring said main exhaust gas and said residual exhaust gas to said secondary apparatus at approximately the same pressure.

2. In a combination power plant comprising a 4-stroke cycle internal combustion engine and secondary expansion apparatus, means for operating said engine on a cycle comprising a suction stroke, a compression stroke, an expansion stroke and an exhaust stroke, means for driving out by the return movement of the pistons of said engine on their exhaust strokes the main exhaust gas, and, by pre-compressed air the residual exhaust gas from the clearance space at the end of said exhaust strokes, means for transferring said main exhaust gas and said residual exhaust gas to said secondary apparatus at approximately the same pressure, and means for so admitting precompressed air that the pressures within said cylinders are maintained substantially above atmospheric pressure throughout the cycle and the supply pressure to the turbine is maintained approximately constant and substantially above atmospheric pressure.

3. A power plant according to claim 2 further including means for beginning engine compression at less than the full cylinder volume of said precompressed air at its admission pressure at a part of the piston stroke where the charge will be finally compressed to the desired working pressure at the end of the compression stroke.

4. A power plant according to claim 2 further including means for discharging precompressed air from said engine to said secondary apparatus during a part of the compression stroke.

5. A power plant according to claim 2 further including means for admitting precompressed air to said engine and discharging it from said cylinder during a part of the compression stroke.

6. A power plant according to claim 2 further including means for admitting precompressed air to said cylinder throughout its intake stroke.

7. A power plant according to claim 2 further including means for admitting precompressed air to said cylinder and discharging it from said cylinder to said secondary apparatus throughout its intake stroke.

8. A power plant according to claim 2 further including means for admitting precompressed air to said cylinder and discharging it from said cylinder to said secondary apparatus throughout its intake stroke and during a part of the compression stroke.

9. A power plant according to claim 2 characterized by having a piston or compressor driven directly by the engine shaft whereby the pressure of the compressed air is constant at the various engine speeds and the volume is proportional to the speed and power of the engine.

In witness whereof, I have hereunto signed my name.

EARLE R. NEWTON.